United States Patent
Sesoko et al.

(10) Patent No.: US 11,059,932 B2
(45) Date of Patent: Jul. 13, 2021

(54) CATALYST COMPOSITION FOR PRODUCING POLYURETHANE FOAM, AND METHOD FOR PRODUCING FLEXIBLE POLYURETHANE FOAM USING IT

(71) Applicant: TOSOH CORPORATION, Shunan (JP)

(72) Inventors: Yusuke Sesoko, Shunan (JP); Hiroyuki Kiso, Shunan (JP)

(73) Assignee: TOSOH CORPORATION, Shunan (JP)

( * ) Notice: Subject to any disclaimer, the term of this patent is extended or adjusted under 35 U.S.C. 154(b) by 176 days.

(21) Appl. No.: 15/776,905

(22) PCT Filed: Nov. 29, 2016

(86) PCT No.: PCT/JP2016/085307
§ 371 (c)(1),
(2) Date: May 17, 2018

(87) PCT Pub. No.: WO2017/094701
PCT Pub. Date: Jun. 8, 2017

(65) Prior Publication Data
US 2018/0334526 A1 Nov. 22, 2018

(30) Foreign Application Priority Data
Nov. 30, 2015 (JP) .............................. JP2015-234000

(51) Int. Cl.
C08G 18/08 (2006.01)
C08G 18/18 (2006.01)
C08G 18/20 (2006.01)
C08J 9/12 (2006.01)

(52) U.S. Cl.
CPC ..... *C08G 18/2063* (2013.01); *C08G 18/0842* (2013.01); *C08G 18/1825* (2013.01); *C08J 9/125* (2013.01); *C08G 2110/0008* (2021.01); *C08G 2110/0083* (2021.01); *C08J 2203/10* (2013.01); *C08J 2205/06* (2013.01); *C08J 2375/04* (2013.01)

(58) Field of Classification Search
CPC .... C08G 18/0842; C08G 18/18; C08G 18/25; C08G 18/2063; C08G 2101/0008; C08G 2101/0083
See application file for complete search history.

(56) References Cited

U.S. PATENT DOCUMENTS 3,925,284 A * 12/1975 Carleton .............. C08G 18/168
521/128
4,382,125 A * 5/1983 Narayan ............. C08G 18/3206
521/160
4,424,288 A * 1/1984 Patton, Jr. .......... C08G 18/4829
521/124

2011/0077386 A1 3/2011 Tokumoto et al.
2011/0091689 A1 * 4/2011 Horio ..................... C08G 18/18
428/160
2012/0178839 A1 * 7/2012 Burdeniuc ............. C08G 18/16
521/121
2013/0289232 A1 * 10/2013 Kiso .................... C07D 487/08
528/49
2015/0094387 A1 * 4/2015 Wiltz, Jr. ............ C08G 18/1833
521/128
2016/0347901 A1 * 12/2016 Burdeniuc ........ C07C 273/1809

FOREIGN PATENT DOCUMENTS

EP      2 857 427      4/2015
JP      46-004846      11/1971
JP      61-31727        7/1986
(Continued)

OTHER PUBLICATIONS

Machine translation of JP 2010-106192 accessed from the European Patent Office website in Jan. 2020 (Year: 2020).*
Machine translation of JP-2009084433-A obtained from European Patent Office in Dec. 2020.*
International Search Report for PCT/JP2016/085307, dated Mar. 7, 2017, 4 pages.
Iwata, "Polyurethane Resin Handbook", the Nikkan Kogyo Simbun Ltd., 1987 First Edition, p. 118.
Rodriguez "Polyols Compatible with Non-Fugitive Amine Catalysts" UTECH, 2003.
Search Report issued in EP Appln. No. 16870638.0 dated Jun. 13, 2019.

*Primary Examiner* — Melissa A Rioja
(74) *Attorney, Agent, or Firm* — Nixon & Vanderhye P.C.

(57) ABSTRACT

To provide a catalyst composition to obtain a flexible polyurethane foam from which substantially no amine compound is discharged and which has sufficient resistance to compressive strain, and a method for producing a flexible polyurethane foam using the catalyst composition.

A polyurethane foam is produced by using a catalyst composition for producing a polyurethane foam, which comprises an amine compound represented by the following formula (1) and at least one glycol selected from the group consisting of ethylene glycol and polyethylene glycol, provided that when the compound of the formula (1) has enantiomers, diastereomers or geometric isomers, both a mixture thereof and isolated isomers are included:

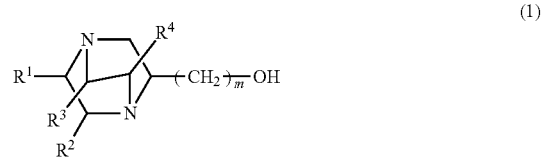

(1)

wherein $R^1$, $R^2$, $R^3$ and $R^4$ are each independently a hydrogen atom, a $C_{1-4}$ alkyl group, a hydroxy group, a hydroxymethyl group or a $C_{1-4}$ alkoxy group, and m is an integer of 1 or 2.

4 Claims, No Drawings

(56) References Cited

FOREIGN PATENT DOCUMENTS

| | | |
|---|---|---|
| JP | 62-20517 | 1/1987 |
| JP | 63-265909 | 11/1988 |
| JP | 02-115211 | 4/1990 |
| JP | 06-86514 | 11/1994 |
| JP | 2971979 | 11/1999 |
| JP | 2001-213928 | 8/2001 |
| JP | 2001-213929 | 8/2001 |
| JP | 2006-131754 | 5/2006 |
| JP | 2007-332375 | 12/2007 |
| JP | 2008-045113 | 2/2008 |
| JP | 2009084433 A * | 4/2009 |
| JP | 2010-037488 | 2/2010 |
| JP | 2010-106192 | 5/2010 |
| JP | 2013-001812 | 1/2013 |
| JP | 2014-521816 | 8/2014 |
| JP | 2015-224325 | 12/2015 |
| JP | 2016-037550 | 3/2016 |

* cited by examiner

CATALYST COMPOSITION FOR PRODUCING POLYURETHANE FOAM, AND METHOD FOR PRODUCING FLEXIBLE POLYURETHANE FOAM USING IT

This application is the U.S. national phase of International Application No. PCT/JP2016/085307 filed Nov. 29, 2016, which designated the U.S. and claims priority to JP Patent Application No. 2015-234000 filed Nov. 30, 2015, the entire contents of each of which are hereby incorporated by reference.

TECHNICAL FIELD

The present invention relates to a catalyst composition for producing a polyurethane foam, and a method for producing a flexible polyurethane foam using it. More particularly, it relates to a method for producing a flexible polyurethane foam which has sufficient resistance to compressive strain and impact resilience, by which substantially no volatile amine compound is discharged during production of a flexible polyurethane foam.

BACKGROUND ART

A polyurethane foam is usually produced by reacting a polyol and a polyisocyanate in the presence of a catalyst and as the case requires, a blowing agent, a surfactant, a flame retardant, a crosslinking agent or the like. In production of a polyurethane foam, various metal compounds and tertiary amine compounds are used as a catalyst. They may be industrially widely used alone or in combination.

In production of a polyurethane foam using, as a blowing agent, water or a low boiling point organic compound or the like, in view of excellent productivity and formability, as a catalyst, especially a tertiary amine compound is widely used. Such a tertiary amine compound may, for example, be 1,4-diazabicyclo[2.2.2]octane (TEDA), N,N,N',N'-tetramethyl-1,6-hexanediamine, bis(2-dimethylaminoethyl)ether, N,N,N',N'',N''-pentamethyldiethylenetriamine, N-methylmorpholine, N-ethylmorpholine, N,N-dimethylethanolamine (for example, Non-Patent Document 1). On the other hand, as a metal compound, for example, an organic metal compound such as an organotin compound is commonly used. Not only metal catalysts deteriorate productivity and formability, but also some of metal catalysts contain a heavy metal such as lead, tin or mercury, and toxicity and environmental problems by the heavy metal remaining in products are of concern, and in most cases, the metal catalyst is used in combination with a tertiary amine catalyst and is hardly used alone.

The tertiary amine compound is gradually discharged from a polyurethane product as a volatile amine compound, which may cause an odor and discoloration of other material (such as skin polyvinyl chloride) in the field of e.g. automobile interior material. Further, the tertiary amine catalyst usually emits a strong odor and remarkably deteriorates working environment at the time of production of a polyurethane foam.

To overcome such problems, a method of using, instead of the volatile tertiary amine catalyst, an amine catalyst having a hydroxy group, a primary amino group or a secondary amino group capable of reacting with a polyisocyanate in its molecule (hereinafter sometimes referred to as a "reactive catalyst") and a bifunctional crosslinking agent having a tertiary amino group in its molecule (for example, Patent Documents 1 to 5).

It is considered that by the above method of using a reactive catalyst, the reactive catalyst is fixed in the skeleton of a polyurethane foam as reacted with the polyisocyanate, whereby the above problems can be avoided. It is certain that this method is effective to reduce odor in a final foam product, however, such a reactive catalyst is inferior in activity of resin-forming reaction (reaction of the polyol and the isocyanate), whereby the curing property may decrease.

With respect to the problem of curing property, an improvement may be achieved by adding a low molecular weight crosslinking agent (for example, Patent Document 6). Further, the applicant has filed a patent application with respect to a catalyst composition which overcomes problems of the volatility of an amine and insufficient curing property simultaneously (for example, Patent Documents 7 and 8). However, such a catalyst composition reacts with a polyisocyanate in the same manner as other reactive catalysts and thereby inhibits an increase of the molecular weight of the obtainable foam, and durability (weather resistance) of a final polyurethane foam product is insufficient.

As the durability required for a flexible high modulus foam used for automobile cushions which make up a significant proportion of the application of a flexible polyurethane foam, compression set may be mentioned. In a case where the flexible polyurethane foam is inferior in the compression set, the thickness of a cushion decreases with time, whereby the position of eyes of the driver may change, or sitting comfortability and riding comfortability may deteriorate.

As an accelerated test method for evaluating the compression set, a thermal aging resistance test (hereinafter sometimes referred to as "dry set") and a moist heat aging resistance test (hereinafter sometimes referred to as "wet set") are mainly employed, and in recent years, along with an improvement of safety consciousness, test conditions for the accelerated test method evaluating the compression set become strict, and a test of compression set of a foam treated at high temperature under humidity for a long period of time (hereinafter sometimes referred to as "dry set after moist heat" or "HACS") is becoming mainstream mainly in Europe and the United States.

In a case where the test of dry set after moist heat is carried out with respect to a foam obtained by using a conventional reactive catalyst, its deterioration is significant as compared with a case where a conventional accelerated test method for evaluating the compression set, and the foam may not comply with the specifications (15% or lower) determined by European automobile companies.

As a conventional method for improving the compression set, it has been known that the number of functional groups in a polyoxyalkylene polyol is increased, or the degree of crosslinking of a flexible polyurethane foam is increased by using a multifunctional crosslinking agent having a low molecular weight (for example, Patent Documents 9 to 11).

An increase of the number of functional groups in a polyoxyalkylene polyol is effective also to improve the dry set after moist heat, however, an improvement of a polyol leads to an increase of the production cost and is not favorable as an industrial method. Further, an increase of the degree of crosslinking of a flexible polyurethane foam by using a multifunctional crosslinking agent having a low molecular weight is known to be ineffective for improvement of the dry set after moist heat (for example, Non-Patent Document 2).

PRIOR ART DOCUMENTS

Patent Documents

Patent Document 1: JP-A-S46-4846
Patent Document 2: JP-B-S61-31727
Patent Document 3: Japanese Patent No. 2971979
Patent Document 4: JP-A-S63-265909
Patent Document 5: JP-A-2008-45113
Patent Document 6: JP-A-2006-131754
Patent Document 7: JP-A-2010-37488
Patent Document 8: JP-A-2010-106192
Patent Document 9: JP-A-H2-115211
Patent Document 10: JP-B-H6-86514
Patent Document 11: JP-A-2007-332375

Non-Patent Documents

Non-Patent Document 1: "Polyurethane Resin Handbook", Keiji Iwata (1987 first edition), the Nikkan Kogyo Simbun Ltd., p. 118
Non-Patent Document 2: J. A. Rodriguez, "POLYOLS COMPATIBLE WITH NON-FUGITIVE AMINE CATALYSTS", UTECH (2003)

DISCLOSURE OF INVENTION

Technical Problem

The present invention has been made to overcome the above problems, and its object is to provide a method for producing a flexible polyurethane foam from which substantially no amine compound is discharged, and which has a sufficient compression set, particularly a flexible polyurethane foam having improved dry set after moist heat, a high level of which is required in recent years, and a catalyst composition used for the method.

Solution to Problem

The present inventors have conducted extensive studies to achieve the above object and as a result, found that a flexible polyurethane foam product from which substantially no volatile amine compound is volatilized and which has improved dry set after moist heat, can be obtained by using, as a catalyst composition for producing a polyurethane foam, a specific amine compound and a specific diol compound in combination, and accomplished the present invention.

That is, the present invention provides the following catalyst composition for producing a polyurethane foam, and method for producing a flexible polyurethane foam using it.

[1] A catalyst composition for producing a polyurethane foam, which comprises an amine compound represented by the following formula (1) and at least one glycol selected from the group consisting of ethylene glycol and polyethylene glycol, provided that when the compound of the formula (1) has enantiomers, diastereomers or geometric isomers, both a mixture thereof and isolated isomers are included:

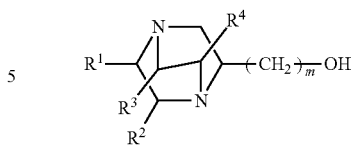

(1)

wherein $R^1$, $R^2$, $R^3$ and $R^4$ are each independently a hydrogen atom, a $C_{1-4}$ alkyl group, a hydroxy group, a hydroxymethyl group or a $C_{1-4}$ alkoxy group, and m is an integer of 1 or 2.

[2] The catalyst composition according to the above [1], wherein in the amine compound of the formula (1), $R^1$, $R^2$, $R^3$ and $R^4$ are a hydrogen atom.

[3] The catalyst composition according to the above [1] or [2], wherein in the amine compound of the formula (1), m is 1.

[4] The catalyst composition according to any one of the above [1] to [3], wherein the hydroxy value of the polyethylene glycol is from 160 to 1,100.

[5] The catalyst composition according to any one of the above [1] to [4], wherein the amine compound of the formula (1) is contained in an amount of from 5 to 95 wt %.

[6] A method for producing a flexible polyurethane foam, which comprises reacting a polyol and a polyisocyanate in the presence of the catalyst composition as defined in any one of the above [1] to [5] and a blowing agent.

[7] The method for producing a flexible polyurethane foam according to the above [6], wherein the amount of the catalyst composition as defined in any one of the above [1] to [5] used is within a range of from 0.01 to 30 parts by weight per 100 parts by weight of the polyol.

[8] The method for producing a flexible polyurethane foam according to the above [6] or [7], wherein the isocyanate index is from 60 to 130, and the blowing agent is water.

Advantageous Effects of Invention

By using the catalyst composition of the present invention, it is possible to obtain a flexible polyurethane foam from which substantially no amine compound is discharged, which has sufficient resistance to compressive strain and which has improved impact resilience. Accordingly, the production method of the present invention is very effective for production of a flexible polyurethane foam which is required to suppress contamination of a polyvinyl chloride resin and to improve the compression set.

Ethylene glycol and polyethylene glycol are a low molecular weight polyhydric alcohol which is considered to have an insufficient effect to improve the dry set after moist heat. Further, they have high hydrophilicity as compared with propylene glycol, and accordingly it is unexpected and surprising that a flexible polyurethane foam produced by using the catalyst composition of the present invention has remarkably improved durability (weather resistance and dry set after moist heat) as compared with a flexible polyurethane foam produced by using a catalyst composition containing propylene glycol or a conventional catalyst composition.

DESCRIPTION OF EMBODIMENTS

Now, the present invention will be described in detail below.

The catalyst composition for producing a polyurethane foam of the present invention comprises an amine compound represented by the above formula (1) and at least one glycol selected from the group consisting of ethylene glycol and polyethylene glycol.

In the present invention, in a case where the amine compound of the formula (1) has enantiomers, diastereomers or geometric isomers, both a mixture thereof and isolated isomers are included.

In the formula (1), the substituents $R^1$, $R^2$, $R^3$ and $R^4$ are not particularly limited so long as they are as defined above and may, for example, be a hydrogen atom, a hydroxy group, a hydroxymethyl group, a $C_{1-4}$ alkyl group (specifically a methyl group, an ethyl group, a n-propyl group, an isopropyl group, a n-butyl group, an isobutyl group, a sec-butyl group, a tert-butyl group or the like) or a $C_{1-4}$ alkoxy group (specifically, a methoxy group, an ethoxy group, a n-propoxy group, an isopropoxy group, a n-butoxy group, a sec-butoxy group, a tert-butoxy group or the like). Among them, preferred is a hydrogen atom, a methyl group, an ethyl group, a hydroxymethyl group or a methoxy group.

In the present invention, the amine compound of the formula (1) is not particularly limited, and is preferably, for example, a compound wherein the substituents $R^1$, $R^2$, $R^3$ and $R^4$ are each independently a hydrogen atom, a methyl group, an ethyl group or a hydroxymethyl group, or a compound wherein all the substituents $R^1$, $R^2$, $R^3$ and $R^4$ are a hydrogen atom. A compound of the formula (1) wherein all the substituents $R^1$, $R^2$, $R^3$ and $R^4$ are a hydrogen atom is preferred also in view of catalytic activity in production of a polyurethane foam.

As specific examples of the amine compound of the formula (1), the following compounds may be mentioned, however, the present invention is by no means restricted thereto.

1
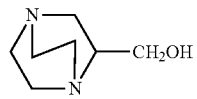

2
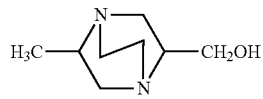

3
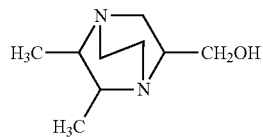

4
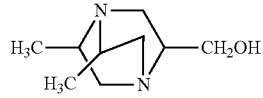

5
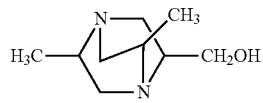

6
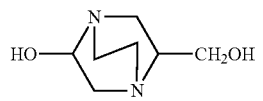

-continued

7
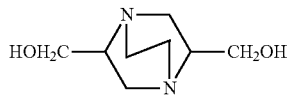

8
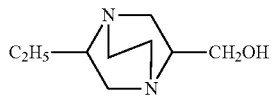

9
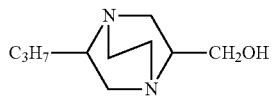

10
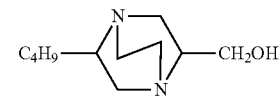

11
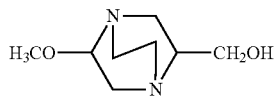

12
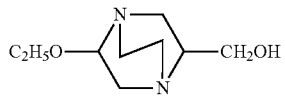

13
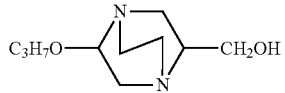

14
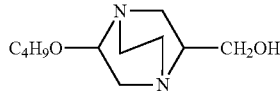

15
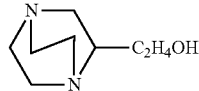

A method for producing the amine compound of the formula (1) is not particularly limited, and for example, the amine compound can be produced by a cyclization reaction of a dihydroxyalkylpiperazine (for example, JP-A-2010-37325).

Further, the amine compound of the formula (1) may be produced, for example, by the method disclosed in Khimiya Geterotsiklicheskikh Soedinenil, 10, 1404 (1980), or WO95/18104. Further, it may also be produced by intramolecular cyclization of an ethylene oxide adduct of a hydroxyalkylpiperazine derived from e.g. the method disclosed in Journal of Medicinal Chemistry (1993), 36 (15), 2075-2083 or JP-A-2010-120887.

The amine compound of the formula (1) having a substituent may be produced by using a corresponding substituted piperazine. The substituted piperazine may be produced by e.g. a known technique relating to preparation of the hydroxyalkylpiperazine described above.

The hydroxy value of polyethylene glycol used for the catalyst composition of the present invention is not particularly limited and is usually within a range of from 160 to 1,110, and in view of handling efficiency of the catalyst composition relating to the solubility, compatibility and the viscosity of the amine compound of the formula (1), it is preferably at least 260, more preferably at least 350, further preferably at least 400. Further, in view of the durability improving effect, it is preferably at most 800, more preferably at most 600.

The content of the amine compound of the formula (1) in the catalyst composition of the present invention (the proportion of the weight of the amine compound of the formula (1) based on the total weight of the amine compound of the formula (1) and at least one glycol selected from the group consisting of ethylene glycol and polyethylene glycol) is not particularly limited, and is usually within a range of from 5 to 95 wt %, preferably within a range of higher than 10 wt % and less than 50 wt %, more preferably within a range of from 25 wt % to 40%. Here, when the content of the amine compound of the formula (1) is higher than 10 wt % and less than 50 wt %, the effect to improve durability of a foam obtainable by using the catalyst composition will further improve, and precipitation of the amine compound of the formula (1) in the catalyst composition during long-term storage or during storage at low temperature is less likely to occur (that is, the foam is excellent in storage stability).

The catalyst composition of the present invention may contain, within a range not to depart from the scope of the present invention, other catalyst (component) other than the amine compound of the formula (1), ethylene glycol and polyethylene glycol. Such a catalyst may, for example, be a known organic metal catalyst or tertiary amine catalyst.

Such an organic metal catalyst may, for example, be stannous diacetate, stannous dioctoate, stannous dioleate, stannous dilaurate, dibutyltin oxide, dibutyltin diacetate, dibutyltin dilaurate, dibutyltin dichloride, dioctyltin dilaurate, lead octoate, lead naphthenate, nickel naphthenate or cobalt naphthenate.

Further, the tertiary amine catalyst may be conventional one and is not particularly limited and may, for example, be a tertiary amine compound such as triethylenediamine, N,N,N',N'-tetramethylhexamethylenediamine, N,N,N',N'-tetramethylethylenediamine, N,N,N',N-tetramethylpropylenediamine, N,N,N',N",N"-pentamethyldiethylenetriamine, N,N,N',N",N"-pentamethyl-(3-aminopropyl)ethylenediamine, N,N,N',N",N"-pentamethyldipropylenetriamine, N,N,N',N'-tetramethylguanidine, 1,3,5-tris(N,N-dimethylaminopropyl)hexahydro-S-triazine, N,N'-dimethylpiperazine, dimethylcyclohexylamine, bis(2-dimethylaminoethyl)ether, 1-methylimidazole, 1,2-dimethylimidazole, 1-isobutyl-2-methylimidazole, N,N,N'-trimethyl-N'-(2-hydroxyethyl)bis(2-aminoethyl)ether or N-(3-aminopropyl)-N,N',N'-trimethyl-2,2'-oxybis(ethylamine). Among them, in view of catalytic activity, particularly preferred is triethylenediamine, bis(2-dimethylaminoethyl)ether, N,N,N'-trimethyl-N'-(2-hydroxyethyl)bis(2-aminoethyl)ether or N,N,N',N'-tetramethylhexamethylenediamine.

The catalyst composition of the present invention is used to accelerate a urethane-foaming reaction (resin-foaming reaction) of a polyol and a polyisocyanate, or a urea-forming reaction (blowing reaction) of a polyisocyanate and water.

Now, the method for producing a flexible polyurethane foam using the catalyst composition of the present invention will be described.

The method for producing a flexible polyurethane foam of the present invention comprises reacting a polyol and a polyisocyanate in the presence of the catalyst composition of the present invention and a blowing agent.

In the present invention, a flexible polyurethane foam means a reversible deformable foam usually having an open cell structure and high air permeability (Gunter Oertel, "Polyurethane Handbook" (1985) Hanser Publishers (Germany), p. 161 to 233 or "Polyurethane Resin Handbook" Keiji Iwata (1987 first edition), the Nikkan Kogyo Shimbun Ltd., p. 150 to 221). The physical properties of the flexible polyurethane foam are not particularly limited, but usually, the density is within a range of from 10 to 100 kg/m$^3$, the compressive strength (ILD25%) is from 200 to 8,000 kPa and the elongation is from 80 to 500%.

In the production method of the present invention, the amount of the catalyst composition of the present invention used is not particularly limited and is usually within a range of from 0.01 to 30 parts by weight, preferably from 0.05 to 15 parts by weight per 100 parts by weight of the polyol used. If the catalyst composition of the present invention is used in a large amount, the productivity of the polyurethane foam may be improved, but the reaction tends to be so quick that closing of the mold may not be done in time.

The polyol to be used for the production method of the present invention may, for example, be a polyether polyol, a polyester polyol or a polymer polyol, and an inflammable polyol such as a phosphorus-containing polyol or a halogen-containing polyol may be used in combination.

The polyether polyol may be produced, for example, by subjecting an alkylene oxide such as ethylene oxide or propylene oxide to an addition reaction to e.g. glycerin or trimethylolpropane, and may be produced, for example, by the method disclosed in Gunter Oertel, "Polyurethane Handbook" (1985) Hanser Publishers (Germany), p. 42 to 53.

The polyester polyol may, for example, be one obtainable from dehydration condensation reaction of a dibasic acid (mainly adipic acid) and glycol or triol, a waste from the production of nylon as disclosed in "Polyurethane Resin Handbook", Keiji Iwata (1987 first edition), the Nikkan Kogyo Simbun Ltd., p. 117, a waste of trimethylolpropane or pentaerythritol, a waste of phthalic acid type polyester, or a polyester polyol obtained by treating a waste.

The polymer polyol may, for example, be a polymer polyol obtained by reacting e.g. the polyether polyol with an ethylenically unsaturated monomer such as butadiene, acrylonitrile or styrene, in the presence of a radical polymerization catalyst.

The inflammable polyol may, for example, be a phosphorus-containing polyol obtainable by addition of an alkylene oxide to a phosphoric acid compound, a halogen-containing polyol obtainable by ring-opening polymerization of epichlorohydrin or trichlorobutylene oxide, or a phenol polymer.

Among them, particularly preferred is a combination of a polyether polyol and a polymer polyol. Further, the polyether polyol is more preferably one having an average molecular weight of from 3,000 to 15,000.

The polyisocyanate to be used for the production method of the present invention may, for example, be an aromatic diisocyanate such as toluene diisocyanate (TDI) or diphenylmethane diisocyanate (MDI), and isomers and cenocytes thereof and a mixture thereof.

TDI or its derivative may, for example, be a mixture of 2,4-toluene diisocyanate and 2,6-toluene diisocyanate or a terminal isocyanate prepolymer derivative of TDI. MDI and its derivative may, for example be a mixture of MDI and polyphenyl-polymethylene diisocyanate as its polymer, or a diphenylmethane diisocyanate derivative having a terminal isocyanate group. Among them, it is preferred to use TDI or its derivative and MDI or its derivative as mixed, or MDI or its derivative alone, whereby the productivity will be improved.

The proportion of the polyisocyanate to the polyol is not particularly limited, but when it is represented by an isocyanate index (isocyanate groups/active hydrogen groups reactive with isocyanate groups), it is usually within a range of from 60 to 130.

The blowing agent to be used for the production method of the present invention is not particularly limited and may, for example, be a flon compound such as 1,1-dichloro-1-fluoroethane (HCFC-141b), 1,1,1,3,3-pentafluoropropane (HFC-245fa), 1,1,1,3,3-pentafluorobutane (HFC-365mfc), 1,1,2-tetrafluoroethane (HFC-134a) or 1,1,1,2,3,3,3-heptafluoropropane (HFC-227ea), a hydrofluoroether such as HFE-254pc, a low boiling point hydrocarbon, water, liquefied carbon dioxide, dichloromethane, formic acid or acetone. They may be used alone or in combination of two or more. As the low boiling point hydrocarbon, usually a hydrocarbon having a boiling point of from −30 to 70° C. is used, and its specific examples include propane, butane, pentane, cyclopentane, hexane and a mixture thereof. In the present invention, among them, water is preferred.

The amount of the blowing agent used is determined depending upon the desired density and foam physical properties and is not particularly limited, and is usually selected so that the obtainable foam density is usually from 5 to 1,000 kg/m$^3$, preferably from 10 to 500 kg/m$^3$.

In the production method of the present invention, if necessary, a surfactant may be used. The surfactant may, for example, be a known organic silicone surfactant, and its amount of use is usually from 0.1 to 10 parts by weight per 100 parts by weight of the polyol.

In the production method of the present invention, if necessary, a crosslinking agent or a chain extender may be added. The crosslinking agent or the chain extender may, for example, be a low molecular weight polyhydric alcohol (such as 1,4-butanediol or glycerin), a low molecular weight amine polyol (such as diethanolamine or triethanolamine) or a polyamine (such as ethylenediamine, xylylene diamine, methylenebis-o-chloroaniline). Among them, preferred is diethanolamine or triethanolamine.

In the production method of the present invention, as described above, the catalyst composition of the present invention may be used alone, or as mixed with the above other catalyst (component), and at the time of mixing them, if necessary, an alcohol such as propylene glycol, dipropylene glycol, 1,4-butanediol or water may be used as a solvent. In the production method of the present invention, a catalyst composition prepared as such may be added to the polyol, or the respective components may be separately added to the polyol, and the addition method is not particularly limited.

In the production method of the present invention, if necessary, a colorant, a flame retardant, an aging-preventing agent, a cell-interconnecting agent or other known additive may be used. The type and the addition amount of such an additive may be within a conventional range.

The production method of the present invention is carried out usually by quickly mixing and stirring a mixed liquid of the materials such as the catalyst composition of the present invention, the polyol, the polyisocyanate and a blowing agent, and injecting the mixed liquid into an appropriate container or mold to conduct blow molding. Mixing and stirring may be carried out by using a conventional stirring machine or a dedicated polyurethane blowing machine. The polyurethane blowing machine may, for example, be a high pressure, low pressure or spray type apparatus.

A product produced by the production method of the present invention may be used for various applications. As specific applications, a crash pad, a mattress, a seat, an automobile-related seat and a head rest may, for example, be mentioned.

The present invention was described in detail with reference to specific embodiments, however, it is obvious to those skilled in the art that various changes and modifications are possible without departing from the scope of the present invention.

The entire disclosure of Japanese Patent Application No. 2015-234000 filed on Nov. 30, 2015 including specification, claims, drawings and summary is incorporated herein by reference in its entirety.

EXAMPLES

Now, the present invention will be described in further detail with reference to Examples. However, it should be understood that the present invention is by no means restricted thereto.

In Table, (pbw) means part(s) by weight of other agents based on 100 parts by weight of the polyol.

Production Example 1

Into a 2 L separable flask, 43.1 g (0.5 mol) of piperazine and 151.8 g (1.5 mol) of triethylamine were charged and diluted with toluene. After the system in the flask was replaced with nitrogen, ethyl 2,3-dibromopropionate (manufactured by Tokyo Chemical Industry Co., Ltd.) diluted with toluene was added with stirring, and aging reaction was carried out at 100° C. for 24 hours. Hydrobromate of triethylamine precipitated was removed by filtration, and the obtained reaction liquid was concentrated to prepare an ester body. The ester body was dissolved in tetrahydrofuran and added to a tetrahydrofuran solution of lithium aluminum hydrate with stirring under cooling with ice. After reaction at room temperature for 2 hours, water and a 15% aqueous sodium hydroxide solution were added to terminate the reaction, and insoluble matters were removed by filtration. The reaction liquid was concentrated and washed by extraction with ethyl acetate. Ethyl acetate was removed, and 48 g (yield: 68%) of the desired compound 1,4-diazabicyclo[2.2.2]octane-2-methanol (hereinafter referred to as "exemplary compound 1") was obtained.

Examples 1 to 6 and Comparative Examples 1 to 7

Catalysts 1 to 13 having an amine compound diluted with a glycol or the like were prepared in blend ratios as identified in Table 1.

TABLE 1

| Catalyst | Amine compound | Glycol | Ratio [1] |
|---|---|---|---|
| Catalyst 1 | Exemplary Compound 1 | Polyethylene glycol 400 [2] | 1/2 |
| Catalyst 2 | Exemplary Compound 1 | Polyethylene glycol 400 [2] | 1/1 |
| Catalyst 3 | Exemplary Compound 1 | Polyethylene glycol 200 [3] | 1/2 |
| Catalyst 4 | Exemplary Compound 1 | Polyethylene glycol 200 [3] | 1/9 |
| Catalyst 5 | Exemplary Compound 1 | Diethylene glycol [3] | 1/2 |
| Catalyst 6 | Exemplary Compound 1 | Ethylene glycol [4] | 1/2 |
| Catalyst 7 | Exemplary Compound 1 | Dipropylene glycol [4] | 1/2 |
| Catalyst 8 | Exemplary Compound 1 | Propylene glycol [4] | 1/2 |
| Catalyst 9 | Exemplary Compound 1 | 2-Methyl-1,3-propanediol [4] | 1/2 |
| Catalyst 10 | Exemplary Compound 1 | Water | 1/2 |
| Catalyst 11 | N,N-dimethyl-aminohexanol [4] | Ethylene glycol [4] | 1/2 |

TABLE 1-continued

| Catalyst | Amine compound | Glycol | Ratio [1] |
|---|---|---|---|
| Catalyst 12 | Triethylenediamine [5] | Ethylene glycol [4] | 1/2 |
| Catalyst 13 | Triethylenediamine [5] | Dipropylene glycol [4] | 1/2 |

[1] Weight ratio of amine compound to glycol
[2] Reagent, manufactured by KANTO CHEMICAL CO., INC.
[3] Reagent, manufactured by KISHIDA CHEMICAL Co., Ltd.
[4] Reagent, manufactured by Tokyo Chemical Industry Co., Ltd.
[5] Manufactured by Tosoh Corporation A premix A was prepared in a raw material blend ratio as identified in Table 2.

TABLE 2

| | Parts by weight (pbw) |
|---|---|
| Polyol [1] | 100.0 |
| Water | 3.3 |
| Cell-interconnecting agent [2] | 2.0 |
| Foam stabilizer [3] | 1.0 |
| Catalyst | Varied |
| Polyisocyanate [4] | NCO Index: 100 [5] |

[1] FA-921 (hydroxy value: 28 mgKOH/g, manufactured by Sanyo Chemical Industries, Ltd.
[2] QB-8000 (manufactured by TOHO Chemical Industry Co., Ltd.)
[3] Y-10366 (manufactured by Momentive Performance Materials Inc.)
[4] Coronate 1334 (NCO content: 30.9 wt %, manufactured by Tosoh Corporation)
[5] Index: (number of moles of NCO groups/number of moles of OH groups) × 100

Examples in which flexible polyurethane foams were produced by using the catalyst composition of the present invention are shown in Table 3.

TABLE 3

| | Ex. 1 | Ex. 2 | Ex. 3 | Ex. 4 | Ex. 5 | Ex. 6 |
|---|---|---|---|---|---|---|
| Catalyst | Catalyst 1 | Catalyst 2 | Catalyst 3 | Catalyst 4 | Catalyst 5 | Catalyst 6 |
| Amount of catalyst [pbw] | 2.88 | 1.94 | 2.82 | 8.62 | 2.76 | 2.70 |
| Reactivity | | | | | | |
| Cream time [sec] | 18 | 17 | 17 | 17 | 18 | 17 |
| Gel time [sec] | 58 | 58 | 59 | 58 | 59 | 58 |
| Rise time [sec] | 68 | 68 | 68 | 67 | 71 | 68 |
| Foam physical properties | | | | | | |
| Total density [kg/m$^3$] | 51.6 | 51.6 | 51.6 | 50.6 | 51.8 | 51.8 |
| ILD (25%) [kN/m$^2$] | 3.4 | 3.4 | 3.4 | 3.6 | 3.5 | 3.5 |
| ILD (65%) [kN/m$^2$] | 9.5 | 9.6 | 9.5 | 9.6 | 10.4 | 10.4 |
| Core density [kg/m$^3$] | 46.0 | 46.1 | 46.5 | 46.5 | 46.3 | 46.1 |
| CLD (40%) [kN/m$^2$] | 3.8 | 3.8 | 3.8 | 3.9 | 3.7 | 3.8 |
| Impact resilience [%] | 49.7 | 49.5 | 49.1 | 51.1 | 48.5 | 48.5 |
| Odor | ○ | ○ | ○ | ○ | ○ | ○ |
| HACS [%] | 12.5 | 12.9 | 13.1 | 14.5 | 13.8 | 14.4 |

| | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|
| Catalyst | Catalyst 7 | Catalyst 8 | Catalyst 9 | Catalyst 10 | Catalyst 11 | Catalyst 12 | Catalyst 13 |
| Amount of catalyst [pbw] | 3.00 | 3.00 | 3.00 | 2.70 | 1.80 | 1.12 | 1.30 |
| Reactivity | | | | | | | |
| Cream time [sec] | 17 | 19 | 18 | 15 | 16 | 18 | 17 |
| Gel time [sec] | 58 | 58 | 58 | 58 | 59 | 58 | 58 |
| Rise time [sec] | 68 | 68 | 68 | 66 | 72 | 67 | 67 |
| Foam physical properties | | | | | | | |
| Total density [kg/m$^3$] | 50.7 | 51.7 | 51.8 | 51.6 | 51.6 | 51.7 | 51.6 |
| ILD (25%) [kN/m$^2$] | 3.6 | 3.5 | 3.6 | 3.8 | 3.8 | 3.4 | 3.5 |
| ILD (65%) [kN/m$^2$] | 10.1 | 10.3 | 10.3 | 10.8 | 10.7 | 9.5 | 9.7 |
| Core density [kg/m$^3$] | 46.0 | 46.0 | 46.0 | 45.7 | 45.6 | 46.3 | 46.0 |
| CLD (40%) [kN/m$^2$] | 3.9 | 3.8 | 3.9 | 4.2 | 4.1 | 3.8 | 3.9 |
| Impact resilience [%] | 46.7 | 44.6 | 45.2 | 46.9 | 45.3 | 46.8 | 46.8 |
| Odor | ○ | ○ | ○ | ○ | Δ | X | X |
| HACS [%] | 14.9 | 16.9 | 15.9 | 19.7 | 22.5 | 11.5 | 10.0 |

85.0 g of the premix A was put in a 300 mL polyethylene cup, and the catalyst composition as identified in Table 1 was added in such an amount that the reactivity represented by the following gel time would be 59±2 seconds, and the temperature was adjusted at 20° C. A polyisocyanate liquid (manufactured by Tosoh Corporation, polyol-modified isocyanate, production name: Coronate 1334) having the temperature adjusted to 20° C. in a separate container, was put in the cup containing the premix A in such an amount that the isocyanate index [[isocyanate groups]/[OH groups](molar ratio)×100)] would be 100, followed by quick stirring at 6,000 rpm for 5 seconds by a stirrer. The mixed liquid having mixed and stirred was transferred to a 2 L polyethylene cup having the temperature adjusted to 60° C., and the reactivity in foaming was evaluated by the following method.

The measurement method and the evaluation method in Examples and Comparative Examples are as follows.

[Measurement of Reactivity]

Cream time: Foam initiating time, the time when the foam started to rise was visually measured.

Gel time: The time when, as the reaction proceeded, the liquid substance changed into a resinous substance was measured.

Rise time: The time when the rise of the foam stopped, was measured by a laser displacement sensor (manufactured by KEYENCE CORPORATION, model: LF-2510).

Then, the starting materials were scaled up, and by a similar operation, the mixed liquid was put in a mold (made of aluminum, with an inner dimension of 25×25×8 cm) having the temperature adjusted to 60° C. so that the foam total density would be 51±2 kg/m³, and a lid was closed, followed by foam molding. The foam was removed from the mold exactly 7 minutes after the mixed liquid was poured. Physical properties of the foam were measured by the following methods.

[Physical Properties of Foam]

Total density: The weight of the foam was measured and divided by the volume.

ILD: It was measured in accordance with ISO2439B. The foam was crushed (75%, three times), and a load required to compress the foam into 25% or 65% was measured.

Impact resilience: A steel ball having a diameter of 16 mm and a mass of 16 g was dropped on the foam from a height of 470 mm and the maximum height of the rebounded ball was recorded. The impact resilience was calculated in accordance with the following formula.

Impact resilience (%)=$D/C$×100

C: The height (mm) from which the steel ball was dropped.

D: The maximum height (mm) of the rebounded ball.

Core density: A center portion of the foam was cut into a size of 20×20×5 cm to obtain a core portion. The weight of the core portion was measured and divided by the volume.

CLD: It was measured in accordance with ISO3386/1. The core portion was crushed (75%, three times), and a load required to compress the core portion into 40% was measured.

[Odor of Foam]

A center portion of the foam was cut into a size of 5×5×3 cm, which was put in a 900 mL mayonnaise bottle, and a lid was closed. The bottle was heated at 80° C. for one hour and then returned to room temperature, whereupon five monitors smelled the foam to evaluate the strength of the odor.

◯: Substantially no odor sensed, Δ: odor slightly sensed, x: odor sensed

[Durability of Foam]

As the durability (weather resistance) of the foam, HACS was measured, which is to detect how the compression set remained after a flexible polyurethane foam which had been subjected to moist heat deterioration was compressed for a predetermined time. The smaller this value, the better the durability.

HACS: From the above core portion, the foam was cut into a size of 5 cm×5 cm×2.5 cm in thickness, which was treated at 90° C. under a relative humidity of 100% for 100 hours, whereupon a compression test was carried out into 50% in a thickness direction at 70° C. under a relative humidity of 5% for 22 hours, and a dimensional change was measured. HACS was calculated in accordance with the following formula.

$HACS(\%)=(E-F)/E \times 100$

E: Initial thickness (cm)

F: Thickness (cm) after compression test

As evident from the comparison between Examples 1 to 6 and Comparative Examples 1 to 4 in Table 3, in Examples 1 to 6 in which the catalyst composition of the present invention comprising the exemplary compound 1 and ethylene glycol or polyethylene glycol was used, a flexible polyurethane foam having favorable durability could be produced. Whereas in Comparative Examples 1 to 4 in which a solvent other than ethylene glycol or polyethylene glycol was used although the exemplary compound 1 was used, the foam had deteriorated durability. Further, the foams in Examples 1 to 6 were superior in the impact resilience to Comparative Examples 1 to 4.

Further, in Comparative Example 5 in which a catalyst composition comprising a reactive catalyst not corresponding to the exemplary compound 1 was used, although ethylene glycol or polyethylene glycol was used, the foam had deteriorated durability, and odor was slightly sensed.

Further, in Comparative Examples 6 and 7 in which a conventional non-reactive catalyst not corresponding to the exemplary compound 1 was used, although the foam was superior in the durability to Examples 1 to 6 and Comparative Examples 1 to 5 in which a reactive catalyst was used, the foam emitted odor.

In Example 1 in which the catalyst composition of the present invention comprising the exemplary compound 1 and ethylene glycol or polyethylene glycol used was catalyst 1 comprising an amine compound and a glycol in a weight ratio of 1/2, the foam had improved durability as compared with Example 2 in which catalyst 2 having the weight ratio being 1/1 (the content of the exemplary compound 1 was high) was used. Further, in Example 3 in which catalyst 3 comprising an amine compound and a glycol in a weight ratio of 1/2 was used, the foam had improved durability as compared with Example 4 in which catalyst 4 wherein the weight ratio was 1/9 (the content of the exemplary compound 1 was low) was used. Further, after the catalyst compositions were stored at 5° C. for one day, in the catalyst composition in Example 2, precipitation of crystals was observed, whereas the catalyst composition in Example 1 had no change and showed higher storage stability.

INDUSTRIAL APPLICABILITY

A flexible polyurethane foam produced by using the catalyst composition of the present invention is useful for e.g. production of a car seat, as an automobile interior material.

The invention claimed is:

1. A catalyst composition for producing a polyurethane foam, which consists of an amine compound represented by the following formula (1):

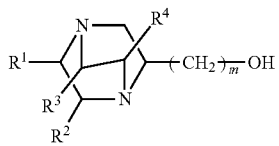

wherein $R^1$, $R^2$, $R^3$ and $R^4$ are hydrogen atoms, and m is an integer of 1, wherein the amine compound of formula (1) corresponds to an isolated enantiomer, isolated diastereomer, isolated geometric isomer, or a mixture thereof, and a polyethylene glycol having a molecular weight of 200 g/mol (PEG-200);

wherein the amine compound of the formula (1) is contained in the catalyst composition in an amount of 10 to 50 wt %;

wherein PEG-200 is contained in the catalyst composition in an amount of from 50 to 90 wt %.

2. A method for producing a flexible polyurethane foam, which comprises combining a polyol, a polyisocyanate, a blowing agent, and the catalyst composition according to claim 1, and then reacting said polyol and said polyisocyanate.

3. The method for producing a flexible polyurethane foam according to claim 2, wherein the amount of the catalyst composition used is within a range of from 0.01 to 30 parts by weight per 100 parts by weight of the polyol.

4. The method for producing a flexible polyurethane foam according to claim 2, wherein the isocyanate index is from 60 to 130, and the blowing agent is water.

* * * * *